(12) United States Patent
Balasubramanian et al.

(10) Patent No.: US 12,392,796 B2
(45) Date of Patent: Aug. 19, 2025

(54) DYNAMIC MULTI-STAGE AIR DATA PROBE PROGNOSTICS HEALTH MONITORING SYSTEM

(71) Applicant: Rosemount Aerospace Inc., Burnsville, MN (US)

(72) Inventors: Rameshkumar Balasubramanian, Apple Valley, MN (US); Cal Roeske, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 331 days.

(21) Appl. No.: 18/101,822

(22) Filed: Jan. 26, 2023

(65) Prior Publication Data

US 2023/0251283 A1 Aug. 10, 2023

(30) Foreign Application Priority Data

Feb. 7, 2022 (IN) .............................. 202241006327

(51) Int. Cl.
*G01P 21/00* (2006.01)
*G01K 13/02* (2021.01)
(Continued)

(52) U.S. Cl.
CPC ............ *G01P 21/00* (2013.01); *G01K 13/028* (2013.01); *G01P 5/16* (2013.01); *G01P 13/025* (2013.01)

(58) Field of Classification Search
CPC .......... G01P 21/00; G01P 13/025; G01P 5/16; G01K 13/028; G05B 2219/45071;
(Continued)

(56) References Cited

U.S. PATENT DOCUMENTS

| 9,939,459 B2 * | 4/2018 | Dichek | ..................... G01F 1/46 |
| 10,564,203 B2 * | 2/2020 | Essawy | .................. G01N 27/20 |

(Continued)

FOREIGN PATENT DOCUMENTS

| CA | 2306767 C * | 5/2007 | ......... G05B 19/0421 |
| EP | 2551660 A2 | 1/2013 | |

(Continued)

OTHER PUBLICATIONS

Extended European Search Report for EP Application No. 23154558.3, dated Jun. 16, 2023, 13 pages.

(Continued)

*Primary Examiner* — Jeffrey P Aiello
(74) *Attorney, Agent, or Firm* — Kinney & Lange, P.A.

(57) ABSTRACT

A method for monitoring a vehicle-borne probe includes receiving, by a first edge device in communication with the probe, sensed data related to a characteristic of a heating element of the probe, analyzing, by a first application of the first edge device, the sensed data to generate a first data output, receiving, by a coordinator in communication with the first edge device, the first data output, and incorporating the first data output into a data package, receiving, by a cloud infrastructure in communication with the coordinator, the data package via a data gateway, and analyzing, by one of the cloud infrastructure and a ground station, the data package to estimate a remaining useful life and a failure of the probe.

20 Claims, 9 Drawing Sheets

(51) Int. Cl.
*G01P 5/16* (2006.01)
*G01P 13/02* (2006.01)

(58) Field of Classification Search
CPC ............ G05B 23/0283; G05B 23/0221; G05B 23/0229; G05B 19/042; G05B 13/028; G01D 21/02; G01L 27/007; H04B 7/18506; H04L 67/12; H04L 67/10; G06N 20/00; G06N 3/02; G06F 17/18; G06V 10/82
USPC ............ 340/6.1; 700/49, 48; 702/34, 183, 3, 702/189, 35, 1, 104, 33, 62, 116, 130, 702/182
See application file for complete search history.

(56) References Cited

U.S. PATENT DOCUMENTS

| | | | |
|---|---|---|---|
| 10,826,626 | B2 | 11/2020 | Jha et al. |
| 11,016,117 | B2 | 5/2021 | Gordon et al. |
| 2012/0179326 | A1 | 7/2012 | Ghelam |
| 2016/0294829 | A1 | 10/2016 | Angus |
| 2017/0293517 | A1 | 10/2017 | Dion |
| 2018/0275183 | A1* | 9/2018 | Essawy ................... H05B 3/56 |
| 2018/0275184 | A1 | 9/2018 | Essawy et al. |
| 2019/0041830 | A1* | 2/2019 | Yarvis .................. G05B 19/042 |
| 2019/0109825 | A1 | 4/2019 | Verraes et al. |
| 2019/0242924 | A1 | 8/2019 | Lang et al. |
| 2019/0331710 | A1 | 10/2019 | Jha et al. |
| 2020/0191850 | A1 | 6/2020 | Essawy et al. |
| 2020/0217824 | A1 | 7/2020 | Jha et al. |
| 2020/0233650 | A1 | 7/2020 | Rajendran et al. |
| 2020/0283126 | A1 | 9/2020 | Dong et al. |
| 2020/0304318 | A1 | 9/2020 | Kravitz et al. |
| 2020/0348662 | A1* | 11/2020 | Cella ................ G05B 19/41865 |
| 2020/0361627 | A1 | 11/2020 | Schwartz et al. |
| 2021/0248338 | A1 | 8/2021 | Spivack et al. |
| 2021/0333099 | A1 | 10/2021 | Zhu et al. |
| 2021/0335059 | A1 | 10/2021 | Dixit |
| 2021/0389968 | A1* | 12/2021 | Majewski ............... G06F 9/541 |
| 2022/0044016 | A1* | 2/2022 | Pan ........................ G06T 19/006 |
| 2022/0317203 | A1 | 10/2022 | Anderson et al. |

FOREIGN PATENT DOCUMENTS

| | | | |
|---|---|---|---|
| EP | 3217364 | A2 * | 9/2017 ............. B64D 45/00 |
| EP | 3739411 | A1 | 11/2020 |
| EP | 3816649 | A1 | 5/2021 |
| WO | 2020131497 | A1 | 6/2020 |
| WO | 2021040795 | A1 | 3/2021 |

OTHER PUBLICATIONS

Extended European Search Report for EP Application No. 23155360.3, dated May 31, 2023, 9 pages.
Extended European Search Report for EP Application No. 23155425.4, dated Jun. 23, 2023, 8 pages.
Extended European Search Report for EP Application No. 23155445.2, dated Jun. 5, 2023, 11 pages.
Nuno Alberto Fonte Silva E Lima, "Development of an Aircraft Health Monitoring Program for Predictive Maintenance", from Thesis to obtain the Master of Science Degree in Aerospace Engineering, Dec. 2017, 118 pages.
Communication pursuant to Article 94(3) EPC for European Patent Application No. 23155425.4, dated Oct. 25, 2024.
Non-Final Office Action dated Feb. 21, 2025, for related U.S. Appl. No. 18/101,855, 42 pgs.

* cited by examiner

DYNAMIC MULTI-STAGE AIR DATA PROBE PROGNOSTICS HEALTH MONITORING SYSTEM

CROSS-REFERENCE TO RELATED APPLICATION(S)

This application claims the benefit of Indian Provisional Application No. 202241006327 filed Feb. 7, 2022 for "DYNAMIC MULTI-STAGE AIR DATA PROBE PROGNOSTICS HEALTH MONITORING SYSTEM" by R. Balasubramanian and C. Roeske.

BACKGROUND

The disclosed subject matter relates generally to prognostics health monitoring, and more particularly, to a modular prognostics health monitoring system for air data probes.

Air data probes are safety-critical sensors installed on all modern aircraft to measure parameters like total pressure, static pressure, and in some cases, pressures for angle of attack and side slip. These probes are external to the aircraft and are exposed to harsh weather conditions and subzero temperatures. Such conditions may cause ice formation on part of the probe resulting in incorrect measurement of air data parameters. Accordingly, resistive heating elements are installed in the air data probes to prevent ice formation. To heat the probe, an operational voltage is provided through the heating element. Prolonged usage and frequent switching (i.e., between the OFF state and ON state) can lead to an abrupt failure of the heating element. When the heating element breaks down, the probe must be replaced prior to subsequent takeoff of the aircraft to ensure continued monitoring air data parameters. Thus, health monitoring of air data probes is critical.

Existing aircraft-based health monitoring systems can monitor various probe parameters but lack the sophistication to analyze the data using complex health monitoring algorithms. Data must be transmitted to a ground station for this purpose. Similarly, modification of the monitoring parameters in current systems requires the removal and reinstallation of the updated data acquisition module. A need exists for a dynamic health monitoring system for real-time prediction of remaining useful life and predicted failure of an air data probe with a high level of accuracy.

SUMMARY

A method for monitoring a vehicle-borne probe includes receiving, by a first edge device in communication with the probe, sensed data related to a characteristic of a heating element of the probe, analyzing, by a first application of the first edge device, the sensed data to generate a first data output, receiving, by a coordinator in communication with the first edge device, the first data output, and incorporating the first data output into a data package, receiving, by a cloud infrastructure in communication with the coordinator, the data package via a data gateway, and analyzing, by one of the cloud infrastructure and a ground station, the data package to estimate a remaining useful life and a failure of the probe.

A system for monitoring a vehicle-borne probe includes a heating element associated with the probe, a first edge device in communication with the probe and configured to sense data related to a characteristic of the heating element, a coordinator in communication with the first edge device and configured to receive a first data output from the first edge device and to incorporate the first data output into a data package, and a cloud infrastructure and a ground station in communication with the coordinator via a data gateway, each being configured to analyze the data package to estimate a remaining useful life and predict a failure of the probe.

Figure 1:
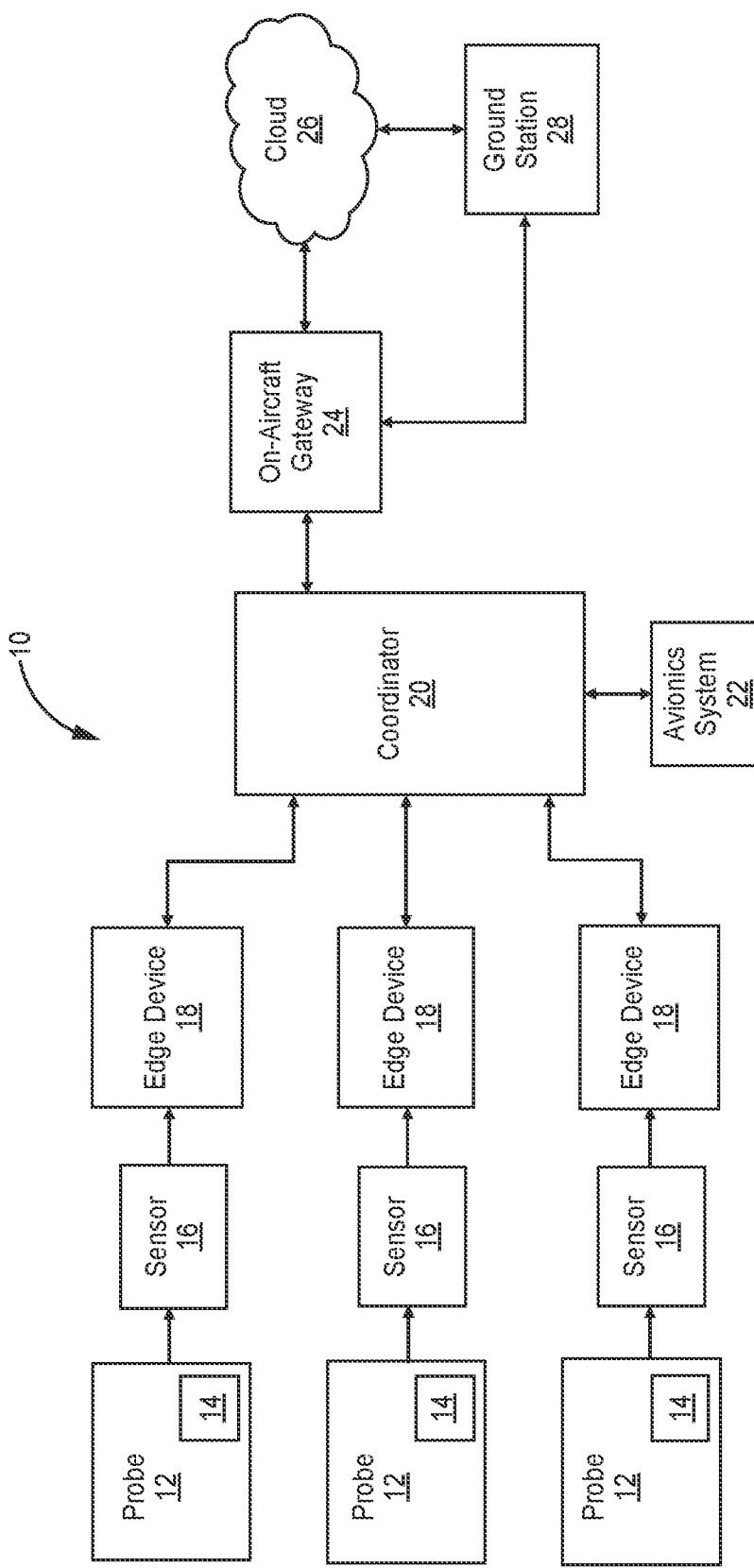
FIG. 1 is a diagram of a prognostics health monitoring system.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a prognostics health monitoring (PHM) system and method for estimating a remaining useful life (RUL) and predicting imminent failure of a vehicle-borne probe, such as an aircraft air data probe. The system includes one or more sensors in communication with each monitored probe. An edge device associated with a probe receives the sensed data and performs various levels of data analytics. Data outputs from each edge device are sent to a smart coordinator of the system for additional monitoring and analysis. The coordinator packages the data and sends it to a cloud infrastructure and ground station for detailed analysis.

FIG. 1 is a schematic block diagram of an exemplary embodiment of multi-stage PHM system 10 for monitoring one or more air data probes 12. System 10 includes a sensor 16 in communication with each probe 12 for monitoring characteristics of a heating element 14 of each probe 12. In some embodiments, more than one sensor 16 can be in communication with a respective probe 12. Each sensor 16 is further in communication with a dynamic edge device 18 for performing initial processing and monitoring of sensed data. Each edge device 18 is in communication with smart coordinator 20 which monitors pre-processed data from each edge device 18, as well as aircraft parameters from one or more avionics systems 22. On-aircraft gateway 24 connects coordinator 20 with cloud 26 and ground station 28. The individual components of system 10 are discussed in greater detail below.

Each probe 12 can be a pitot probe, total air temperature (TAT) probe, or angle-of-attack (AOA) probe, to name a few non-limiting examples, configured to measure aircraft operational parameters such as pressure and/or temperature. In an alternative embodiment, probes 12 can be mounted to other types of (non-aerial) vehicles and can be suitable for measuring operational parameters of such vehicles. Each probe 12 includes a resistive heating element 14, such as a heater wire, powered by a source of alternating (AC) or direct (DC) current. The flow of current through heating element 14 provides heating to the associated probe 12 to prevent ice accretion. The one or more sensors 16 in communication with a respective probe 12 can measure characteristics of an associated heating element 14, such as current, capacitance, and/or voltage.

Figure 2:
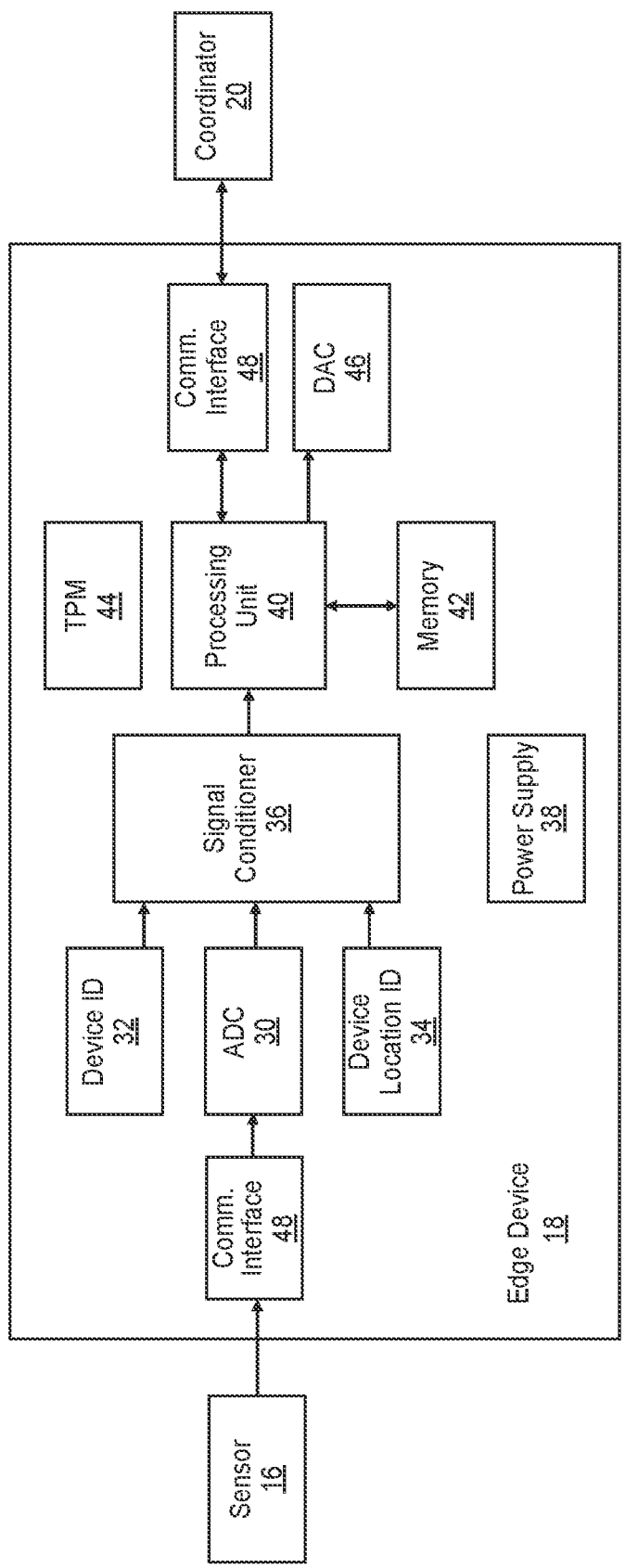
FIG. 2 is a diagram of an edge device of the prognostics health monitoring system.

Each sensor 16 outputs sensed heating element 14 data to an associated edge device 18. FIG. 2 is a schematic block diagram of an exemplary edge device 18 as a modular end node. Shown in FIG. 2 as part of edge device 18 are analog-to-digital converter (ADC) 30, device identification (ID) 32, device location identification (ID) 34, signal conditioner 36, power supply 38, processing unit 40, memory 42, trusted platform module (TPM) 44, digital-to-analog converter (DAC) 46, and input/output communication interfaces 48.

In operation of system 10, data from sensor 16 is received by edge device 18 via a wired (e.g., Ethernet, AFDX, ARINC 429, RS232/422/485, CAN, etc.) or wireless (e.g., Bluetooth, Wi-Fi, cellular, etc.) first/input communication interface 48. The latter type of connection permits a sensor 16 and associated edge device 18 to be in physically separate locations on the aircraft. ADC 30 converts the received sensor 16 output signals to digital signals. Subsequent signal conditioning (e.g., filtering, linearization, amplification, etc.) is performed by signal conditioner 36. Power supply 38 can be any suitable source of power, such as a battery, energy harvesting devices, or other sources on the aircraft. Upon power-up of edge device 18, processing unit 40 reads device ID 32 and device location ID 34 to determine/confirm the type and physical location of edge device 18. Processing unit 40 then reads the device configuration stored in memory 42 and configures edge device 18 based on device ID 32 and location ID 34. Memory 42 can further store data and applications for access by processing unit 40. Processing unit 40 can be, for example, a microprocessor or microcontroller configured to perform various data processing and analysis tasks, discussed in greater detail below, and output processed data to coordinator 20 via second/output communication interface 48. Output communication interface 48 may be of the wired or wireless type discussed above with respect to input communication interface 48. Output communication interface 48 is configured to exchange data with coordinator 20. TPM 44 is at least one of various cybersecurity measures (e.g., certificate management, advanced encryption, etc.) implemented by edge device 18 for securely communicating with interfacing devices and systems.

Figure 3:
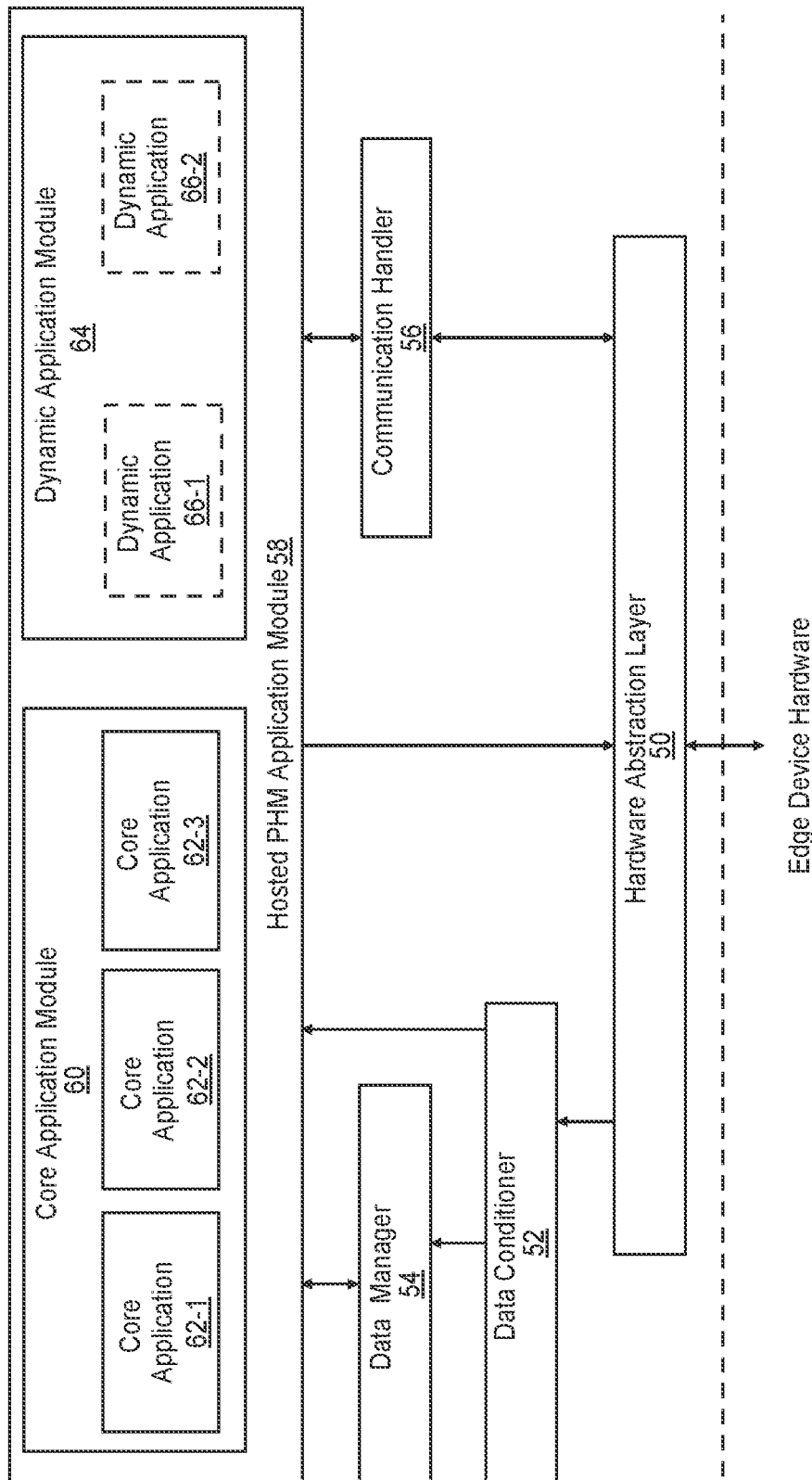
FIG. 3 is a diagram of select software of the edge device.

FIG. 3 is a schematic block diagram of select software of edge device 18. Edge device 18 software can include hardware abstraction layer 50, data conditioner 52, PHM data manager 54, communication handler 56, and hosted PHM application module 58. Hardware abstraction layer 50 includes various board support packages and device drivers for abstracting hardware interfaces (e.g., device ID, discrete input/output, analog input/output, communication interfaces, etc.) of edge device 18. Hardware abstraction layer can abstract higher level software modules from any changes in such hardware. Data conditioner 52 acquires signals from the hardware at the configured rate, filters the data, and stores the data in memory 42 (shown in FIG. 2) which is accessible by data manager 54. Data manager 54 manages edge device 18 data according to its configuration. Data manager 54 implements a publish/subscribe methodology to enable one or more applications of hosted PHM application module 58 to publish processed data while others of the applications can subscribe for data for processing. Any published data are automatically broadcast to any applications which have subscribed for that data. Data manager 54 further allows for space and time partitioning of the various hosted PHM applications which enables multiple Development Assurance Level (DAL) software/applications to coexist in edge device 18. Communication handler 56 implements wrapper software to the various wired and/or wireless communication interfaces implemented in edge device 18. Communication handler 56 provides standard software interfaces (e.g., SDK or APIs) to interfacing hosted PHM applications to enable communication with the external systems. Communication handler 56 uses cybersecurity measures (e.g., TPM, EAP-TLS, certificate management, advanced encryption, etc.) implemented in the operating system (OS) to ensure security of edge device 18 and its communications with interfacing devices/systems, including coordinator 20, and other avionics systems.

Hosted PHM application module 58 can include core application module 60 with core applications 62-1, 62-2, and 62-3 (collectively referred to as "core applications 62"), and dynamic application module 64 with dynamic applications 66-1 and 66-2 (collectively referred to as "dynamic applications 66"). Various embodiments of edge device 18 can include any number of 1 to n core applications 62 and/or 0 to m dynamic applications 66. In some embodiments, core applications 62 and/or dynamic applications 66 can be incorporated into a field load bundle that enables updating of the hosted applications. The field load bundle can additionally and/or alternatively include any of the following sections for updating: device configuration information (e.g., edge device ID and location ID, serial number, part number, etc.), cybersecurity (e.g., certificates, encryption keys, etc.), device-specific software containing configuration information (e.g., input sample size, sampling rate, output rate, parameters, communication protocol, etc.), and software/firmware (e.g., executable object code, parameter data item, etc.).

Core applications 62 enable implementation of the PHM functions of edge device 18. More specifically, core application 62-1 can be an advanced local PHM data repository for implementing reusable data analytics algorithms (e.g., Fast Fourier Transform (FFT), arc fault detection, etc.) local to edge device 18. The various hosted PHM applications can use the algorithms implemented in the data analytics repository instead of duplicating their implementation. Core application 62-2 can be a stage-1 pre-PHM data processing application for continuously monitoring sensed heater 14 data, and for performing coarse-PHM data analytics on the sensed data using one or more coarse-PHM data analytics algorithms. Any resulting coarse data analytics outputs can be sent to coordinator 20, as well as further monitored by one of the dynamic applications 66, as is discussed in greater detail below. Core application 62-3 can be a field loader application for updating any of the bundled applications or sections discussed above.

Dynamic applications 66 are optional PHM applications that can be temporary or short-term in nature. More specifically, dynamic applications 66 can be automatically loaded onto edge device 18 by coordinator 20 and/or enabled/activated by the occurrence of one or more trigger events. As such, dynamic applications 66 can be automatically deactivated after a specific interval or when other conditions occur. Dynamic application 66-1 can include one or more application-specific monitoring algorithms (e.g., for brake temperature monitoring, acoustics monitoring, smart BIT, battery monitoring, vibration monitoring, cabin temperature monitoring, heater current arc fault detection, etc.). Dynamic application 66-2 can be a stage-2 targeted PHM assessment application for monitoring the coarse data outputs from the stage-1 pre-PHM application, performing finer data analysis on the monitored data, and dynamically updating the data monitoring scheme of the hosting edge device 18. The finer data analysis can include monitoring of additional parameters from the associated sensor 16, monitoring of parameters at a higher rate, and/or monitoring of higher parameters at higher precision and/or processing.

Figure 4A:
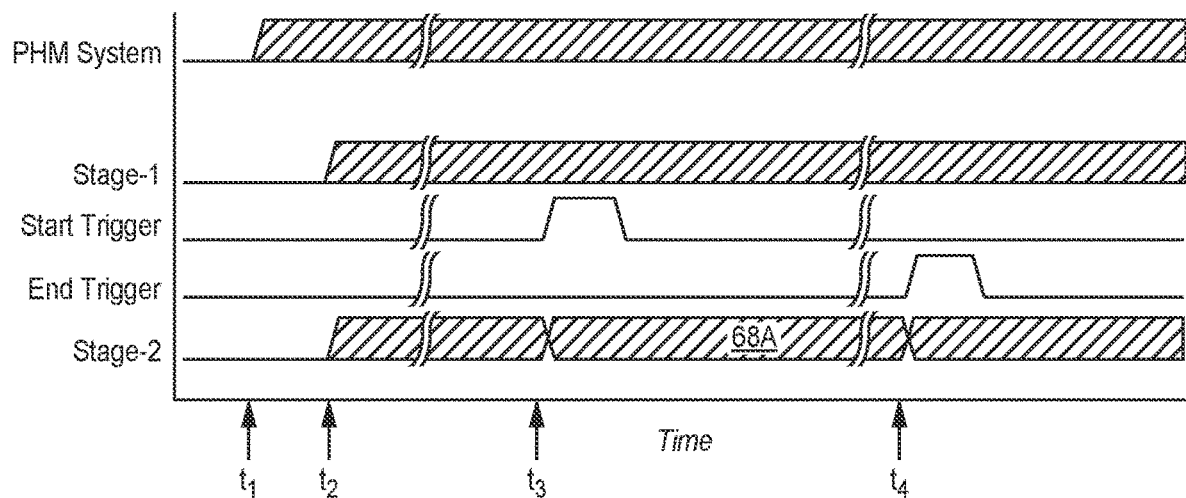
FIG. 4A is a plot showing the operation of a stage-1 data processing application and a pre-loaded stage-2 data processing application.
Figure 4B:
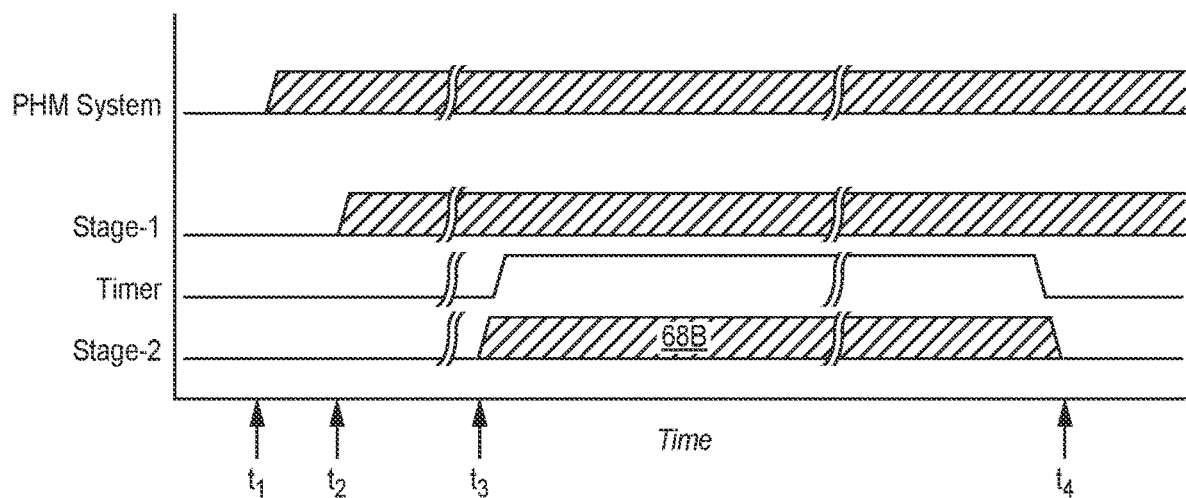
FIG. 4B is a plot showing the operation of a stage-1 data processing application and a dynamically loaded stage-2 data processing application.
Figure 4C:
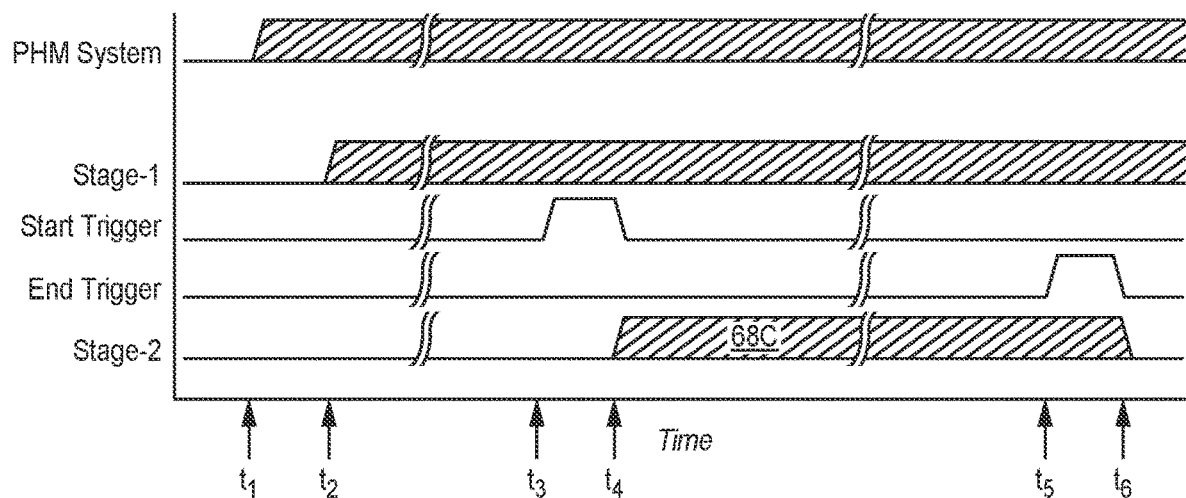
FIG. 4C is a plot showing the operation of a stage-1 data processing application and an alternative dynamically loaded stage-2 data processing application.

FIG. 4A is a plot, over time, of the operation of the stage-1 pre-PHM data processing application and a pre-loaded stage-2 targeted PHM assessment application. FIG. 4B is a plot, over time, of the operation of the stage-1 pre-PHM data processing application and an alternative, dynamically loaded, time-bound stage-2 targeted PHM assessment application. FIG. 4C is a plot, over time, of the operation of the stage-1 pre-PHM data processing application and a second alternative dynamically loaded, trigger-based stage-2 targeted PHM assessment application.

As shown in FIG. 4A from the top to the bottom of the y-axis, are plots of PHM system 10, the stage-1 pre-PHM data processing application, start and end triggers, and the stage-2 targeted PHM assessment application. Beginning at time $t_1$, system 10 is running and active. At time $t_2$, the stage-1 pre-PHM data processing application is activated. In the embodiment of FIG. 4A, the stage-2 targeted PHM assessment application is pre-loaded onto edge device 18 and continuously monitors the data outputs generated by the stage-1 application for trigger events. As such, the stage-2 targeted PHM assessment application begins operating at time $t_2$. A "start" trigger event occurs at time $t_3$. For any of the embodiments of FIGS. 4A-4C, a "start" trigger event can be, for example, a probe fault, or exceedance of a predetermined parameter threshold or count. Also at time $t_3$, the stage-2 targeted PHM assessment application begins finer data analytics, as identified by interval 58A. An "end" trigger event occurs at time $t_4$, and the stage-2 targeted PHM assessment application ceases finer data analytics and continues monitoring stage-1 data. An "end" trigger event can be, for example, the ending of or return to normal values of a "start" trigger event, or a different trigger event based on another monitored parameter. Interval 68A is defined by the "start" and "end" trigger events of times $t_3$ and $t_4$, respectively, and represents activation of the stage-2 targeted PHM assessment application to perform finer data analysis and generate a finer data analytics output to be sent to coordinator 20.

The embodiment of FIG. 4B is similar to the embodiment of FIG. 4A, except that the stage-2 targeted PHM assessment application is dynamically loaded and activated by coordinator 20. The stage-2 targeted PHM assessment application is time-bound such that it is configured to run for a predetermined interval (interval 68B) once activated. Activation can occur by a "start" trigger event, and deactivation with time elapsing. As with the embodiment of FIG. 4A, PHM system 10 and the stage-1 pre-PHM data processing application become active at times $t_1$ and $t_2$, respectively. At time $t_3$, the timer begins running as the result of a "start" trigger or other event, and the stage-2 targeted PHM assessment application is activated to perform finer data analysis. Time elapses at time $t_4$ and the stage-2 targeted PHM assessment application is deactivated. The finer data analytics output generated by the stage-2 targeted PHM assessment application can be sent to coordinator 20. In an alternative embodiment, activation/deactivation of the stage-2 targeted PHM assessment application may not occur simultaneously with the starting/ending of the timer, rather, interval 68B can be slightly offset from the timer due to a cycle delay in processing the event triggering the timer.

FIG. 4C shows an alternative dynamically loaded stage-2 targeted PHM assessment application configured for trigger-based activation. As with the embodiments of FIGS. 4A and 4B, PHM system 10 and the stage-1 pre-PHM data processing application become active at times $t_1$ and $t_2$, respectively. At time $t_3$, a "start" trigger event occurs, causing activation of the stage-2 targeted PHM assessment application to perform finer data analytics at time $t_4$. An "end" trigger event occurs at time is leading to deactivation of the stage-2 targeted PHM assessment application at time $t_6$. Interval 68C defines the period of activity of the stage-2 targeted PHM assessment application. As with the embodiments of FIGS. 4A and 4B, the finer data analytics output generated by the stage-2 targeted PHM assessment application can be sent to coordinator 20.

Figure 5:
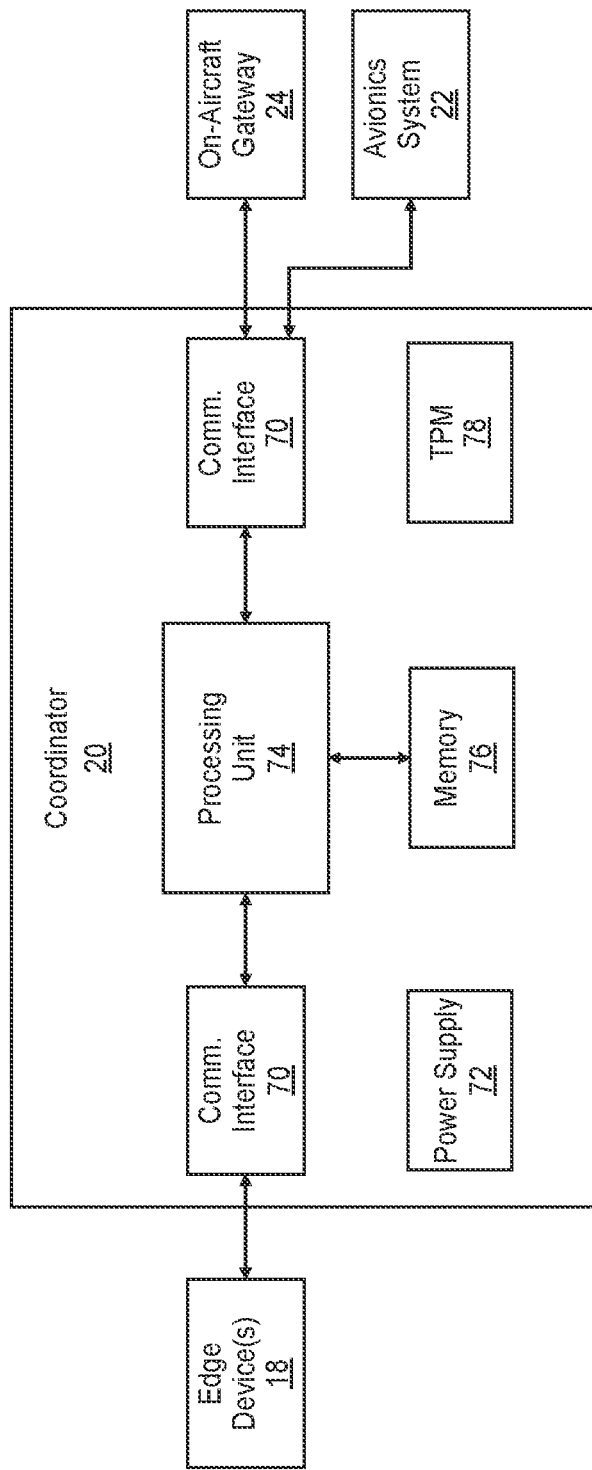
FIG. 5 is a diagram of a smart coordinator of the prognostics health monitoring system.

FIG. 5 is a schematic block diagram of an exemplary smart coordinator 20. As shown in FIG. 5, coordinator 20 includes communication interfaces 70 interfacing with one or more edge devices 18, on-aircraft gateway 24, and one or more avionics systems 22. Through its interface with avionics systems 22, coordinator 20 can monitor aircraft parameters such as air speed, weight-on-wheel, latitude, longitude, altitude, etc. Further included are power supply 72, processing unit 74 (e.g., a microprocessor or microcontroller), memory 76, and TPM 78. Communication interfaces 70 can be wired (e.g., Ethernet, AFDX, ARINC 429, RS232/422/485, CAN, etc.) or wireless (e.g., Bluetooth, Wi-Fi, cellular, etc.) interfaces for exchanging data with connected devices and systems. Power supply 72 can be a battery, or energy harvesting devices or other sources on the aircraft. Upon power-up, processing unit 74 retrieves edge device 18 and/or coordinator 20 updates (e.g., software, configuration information, field load bundles, etc.) from ground station 28 or cloud 26 via on-aircraft gateway 24. Each edge device 18 interfaced with coordinator 20 attempts to connect with coordinator 20 until coordinator 20 rejects or accepts the request by authenticating the requesting edge devices 18. Connected edge devices 18 are dynamically configured by coordinator 20, which transmits the latest software, configuration, trigger events, etc. to edge devices 18. Processing unit 74 accesses various data and applications from memory 76.

As discussed above with respect to FIGS. 4B and 4C, coordinator 20 can monitor the stage-1 pre-PHM coarse data outputs from an associated edge device 18, and dynamically load a stage-2 targeted assessment application to the edge device 18 if any trigger events occur. The application can be loaded using, for example, a field load bundle. Upon successful loading, coordinator 20 can activate and deactivate the stage-2 targeted assessment application as necessary based on activation parameters (e.g., trigger events, predetermined time intervals, etc.). In some embodiments, coordinator 20 can be configured to locally (i.e., within coordinator 20) implement the stage-2 targeted assessment application using processing unit 74.

Figure 6:
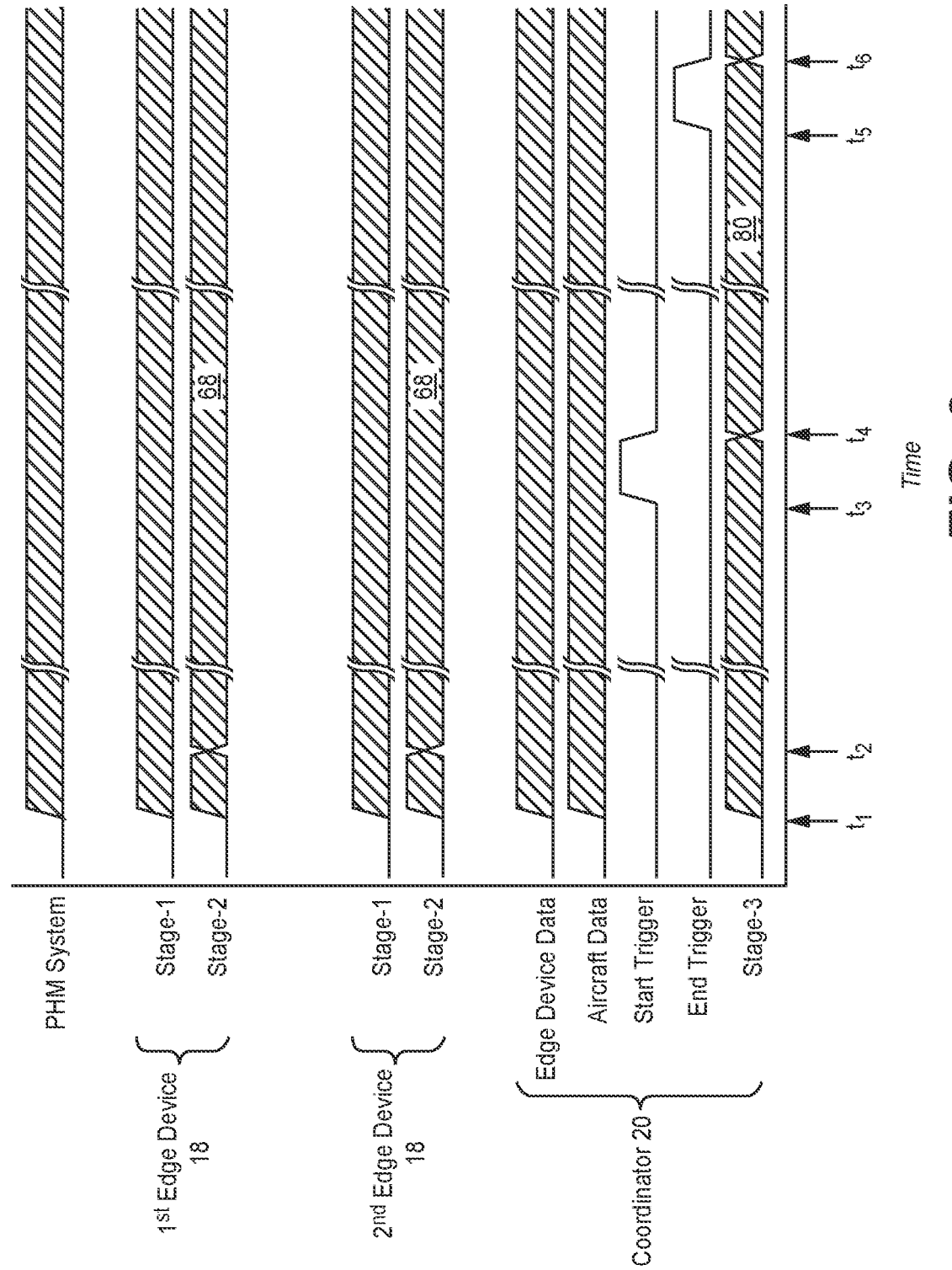
FIG. 6 is a plot showing the operation of a stage-3 data analytics application implemented by the smart coordinator.

Coordinator 20 can further synthesize monitored aircraft data from avionics system(s) 22 with the coarse data (stage-1) and finer data (stage-2) analytics outputs from multiple edge devices 18 for determining trigger events and making monitoring decisions. Accordingly, coordinator 20 can implement stage-3 PHM data analytics on the synthesized data. FIG. 6 is a plot, over time, of the operation of the stage-3 data analytics application on the data monitored by coordinator 20. Shown in FIG. 6, from the top to the bottom of the y-axis, are plots of the operation of PHM system 10, the stage-1 pre-PHM data processing applications and stage-2 targeted PHM assessment applications of a first and second edge devices 18, monitored data from edge devices 18, monitored aircraft data, start and end triggers, and the stage-3 PHM data analytics application. Although only two edge devices 18 are represented on the plot of FIG. 6, coordinator 20 can monitor and analyze data from more than two edge devices 18 in alternative embodiments.

At time $t_1$, system 10 and the stage-1 and stage-2 applications from each edge device 18 are activated, and coordinator 20 begins monitoring edge device and aircraft data. At time $t_2$, the stage-2 applications from each edge device 18 are activated for an interval defined generically as interval 68. The "start" trigger event for activation of the stage-2 applications is not plotted in FIG. 6. At time $t_3$, a "start" trigger event, based on the monitored edge device and aircraft data, occurs and coordinator 20 begins stage-3 PHM data analytics at time $t_4$. At time $t_5$, an "end" trigger event occurs, and coordinator 20 ceases stage-3 PHM data analytics at time $t_6$. Interval 80 is defined by the "start" and "end" trigger events and represents activation of stage-3 PHM data analytics and generation of a stage-3 data analytics output by coordinator 20. In an alterative embodiment, stage-3 PHM data analytics can be time-bound (i.e., enabled for predetermined intervals) in a manner substantially similar to the stage-2 targeted PHM assessment application of FIG. 4B.

Data received and/or analyzed by coordinator 20 (e.g., aircraft data, stage-1, stage-2 and/or stage-3 data analytics outputs) can be timestamped and packaged before sending to cloud 26 and/or ground station 28. Cybersecurity measures, such as encryption and digital signatures, can be implemented by TPM 78 to ensure confidentiality, integrity, and authentication of the data package(s). In an alternative embodiment, system 10 can include more than one coordinator 20, and data packages can be shared among the multiple coordinators 20. Data packages are shared with cloud 26 and/or ground station 28 via on-aircraft gateway 24. Referring back to FIG. 1, on-aircraft gateway 24 is distinct from coordinator 20, however, coordinator 20 and on-aircraft gateway 24 can be grouped together in an alternative embodiment to facilitate implementation of the two components.

Figure 7:
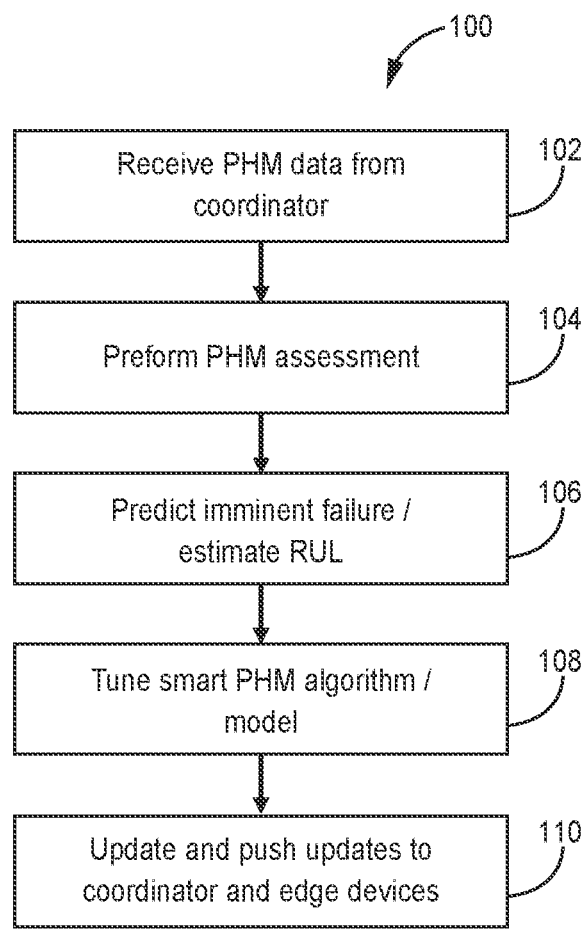
FIG. 7 is a flow chart illustrating a method of determining a remaining useful life and predicting imminent failure of a probe, as implemented by a cloud infrastructure of the prognostics health monitoring system.

Cloud 26 can implement a cloud-hosted PHM data analytics application for analyzing, using machine learning techniques, received PHM data to predict imminent failure and estimate RUL of air data probes 12. FIG. 7 is a flowchart illustrating method 100 showing the prediction, estimation, and updating functions of cloud 26. At step 102, the data package is received by cloud 26 from coordinator 20. At step 104, cloud 26 performs a PHM assessment on the data. At step 106, the assessment can be used to predict imminent failure and estimate RUL of probe 12. This can be accomplished, for example, by using machine learning techniques to analyze received data, as well as monitored aircraft data, data history, and trend data. Supplemental flight data such as weather, flight path, service history, etc. can also be included and analyzed. At step 108, cloud 26 can automatically and intelligently tune/refine algorithms of the stage-1, stage-2 and/or stage-3 applications to improve the relevance and quality of collected data for more accurate RUL estimation and failure prediction. At step 110, the cloud-hosted PHM data analytics application can update trigger events and data collection and monitoring strategies, as necessary. Updates can be included in field load bundles and pushed/transmitted, by cloud 26, to coordinator 20 and edge devices 18.

Cloud 26 can further implement data storage for storing monitored data. Ground station 28 can access data stored in cloud 26 to perform additional analysis using, for example, advanced PHM algorithms, to further improve upon technologies and methods for estimating RUL and predicting imminent failures of probes 12. In some embodiments, ground station 28 can be configured to carry out the failure prediction and RUL estimation of method 100 in addition to, or as an alternative to cloud 26. This can be the case, for example, where it is desirable to provide redundancy, or where the functions of cloud 26 and ground station 28 overlap. RUL and failure predictions can be reported to a database monitored by and accessible to aircraft maintenance personnel. Such reporting can be accomplished via an alert or notification generated by an application of cloud 26, and/or by ground station 28. PHM system 10 allows for a tailored maintenance approach that allows for the timely replacement of faulty probes to minimize operational disruption and avoids the unnecessary replacement of healthy probes based on flight hours or other standard metrics.

DISCUSSION OF POSSIBLE EMBODIMENTS

The following are non-exclusive descriptions of possible embodiments of the present invention.

A method for monitoring a vehicle-borne probe includes receiving, by a first edge device in communication with the probe, sensed data related to a characteristic of a heating element of the probe, analyzing, by a first application of the first edge device, the sensed data to generate a first data output, receiving, by a coordinator in communication with the first edge device, the first data output, and incorporating the first data output into a data package, receiving, by a cloud infrastructure in communication with the coordinator, the data package via a data gateway, and analyzing, by one of the cloud infrastructure and a ground station, the data package to estimate a remaining useful life and a failure of the probe.

The method of the preceding paragraph can optionally include, additionally and/or alternatively, any one or more of the following features, configurations and/or additional components:

In the above method, the characteristic of the heating element can be one of current, capacitance, and voltage.

Any of the above methods can further include: analyzing, by a second application of the first edge device, the first data output to generate a second data output, receiving, by the coordinator, the second data output, and incorporating, by the coordinator, the second data output in the data package.

In any of the above methods, the first application can be a core application, and the second application can be a dynamic application.

Any of the above methods can further include: monitoring, by the core application, the sensed data, and analyzing, by the core application, the sensed data to generate the first data output.

Any of the above methods can further include: monitoring, by the dynamic application, the first data output, analyzing, by the dynamic application, the first data output if a trigger event occurs, and generating, by the dynamic application, the second data output.

Any of the above methods can further include: loading and activating, by the coordinator, the dynamic application to a dynamic application module of the first edge device if the trigger event occurs. The trigger event can include a start event.

In any of the above methods, the start event can include at least one of a probe fault, and exceedance of a parameter threshold or count.

In any of the above methods, the trigger event can further include an end event, and the end event can include one of elapsing of a predetermined amount of time after the start event, and exceedance of a parameter threshold or count.

Any of the above methods can further include: receiving, by a second edge device in communication with a second probe, sensed data related to a characteristic of a heating element of the second probe, and analyzing, by a third application of the second edge device, the sensed data to generate a third data output.

Any of the above methods can further include: analyzing, by a fourth application of the second edge device, the third data output to generate a fourth data output.

Any of the above methods can further include: receiving, by the coordinator, the third data output and the fourth data output, and incorporating, by the coordinator, the third data output and the fourth data output into the data package.

Any of the above methods can further include: monitoring, by the coordinator, a plurality of vehicle parameters, and incorporating, by the coordinator, the monitored plurality of vehicle parameters into the data package.

Any of the above methods can further include: analyzing, by fifth application of the cloud infrastructure, the data package, and estimating the remaining useful life and predicting the failure of the probe based on the analysis of the packaged data.

Any of the above methods can further include: analyzing, by a second application of the coordinator, the first data output if a trigger event occurs, generating, by the second application, a second data output, and incorporating, by the coordinator, the second data output in the data package. The first application can be a core application and the second application can be a dynamic application.

A system for monitoring a vehicle-borne probe includes a heating element associated with the probe, a first edge device in communication with the probe and configured to sense data related to a characteristic of the heating element, a coordinator in communication with the first edge device and configured to receive a first data output from the first edge device and to incorporate the first data output into a data package, and a cloud infrastructure and a ground station in communication with the coordinator via a data gateway, each being configured to analyze the data package to estimate a remaining useful life and predict a failure of the probe.

The system of the preceding paragraph can optionally include, additionally and/or alternatively, any one or more of the following features, configurations and/or additional components:

In the above system, the edge device can include a core application module configured to host a core application, and a dynamic application module configured to host a dynamic application. The core application can be configured to monitor and analyze sensed data and generate the first data output, and the dynamic application can be configured to analyze the first data output and generate a second data output.

Any of the above systems can further include: a second edge device in communication with a second probe and configured to sense data related to a characteristic of a heating element of the second probe.

In any of the above systems, the coordinator can be in communication with the first edge device and the second edge device, and the coordinator can be configured to incorporate the first data output, the second data output, and a third data output from the second edge device into the data package.

In any of the above systems, the vehicle can be an aircraft, and the probe can be one of a pitot probe, a total air temperature probe, and an angle of attack probe.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for monitoring a vehicle-borne probe, the method comprising:
   receiving, by a first edge device in communication with the probe, sensed data related to a characteristic of a heating element of the probe;
   analyzing, via prognostic health monitoring functions of a first application of the first edge device, the sensed data to generate a first data output;
   receiving, by a coordinator in communication with the first edge device, the first data output, and incorporating the first data output into a data package;
   receiving, by a cloud infrastructure in communication with the coordinator, the data package via a data gateway;
   analyzing, by one of the cloud infrastructure and a ground station, the data package to estimate a remaining useful life and a failure of the probe; and
   scheduling a timely replacement of the probe based on the remaining useful life of the probe.

2. The method of claim 1, wherein the characteristic of the heating element is one of current, capacitance, and voltage.

3. The method of claim 1, and further comprising:
   analyzing, by a second application of the first edge device, the first data output to generate a second data output;
   receiving, by the coordinator, the second data output; and
   incorporating, by the coordinator, the second data output in the data package.

4. The method of claim 3, wherein the first application is a core application, and wherein the second application is a dynamic application.

5. The method of claim 4 and further comprising:
   monitoring, by the core application, the sensed data; and analyzing, by the core application, the sensed data to generate the first data output.

6. The method of claim 5 and further comprising:
monitoring, by the dynamic application, the first data output;
analyzing, by the dynamic application, the first data output if a trigger event occurs; and
generating, by the dynamic application, the second data output.

7. The method of claim 6 and further comprising:
loading and activating, by the coordinator, the dynamic application to a dynamic application module of the first edge device if the trigger event occurs;
wherein the trigger event comprises a start event.

8. The method of claim 7, wherein the start event comprises at least one of a probe fault, and exceedance of a parameter threshold or count.

9. The method of claim 8, wherein the trigger event further comprises an end event, and the end event comprises one of elapsing of a predetermined amount of time after the start event, and exceedance of a parameter threshold or count.

10. The method of claim 1, and further comprising:
receiving, by a second edge device in communication with a second probe, sensed data related to a characteristic of a heating element of the second probe; and
analyzing, by a third application of the second edge device, the sensed data to generate a third data output.

11. The method of claim 10 and further comprising:
analyzing, by a fourth application of the second edge device, the third data output to generate a fourth data output.

12. The method of claim 11 and further comprising:
receiving, by the coordinator, the third data output and the fourth data output; and
incorporating, by the coordinator, the third data output and the fourth data output into the data package.

13. The method of claim 12 and further comprising:
monitoring, by the coordinator, a plurality of vehicle parameters; and
incorporating, by the coordinator, the monitored plurality of vehicle parameters into the data package.

14. The method of claim 13 and further comprising:
analyzing, by a fifth application of the cloud infrastructure, the data package; and
estimating the remaining useful life and predicting the failure of the probe based on the analysis of the packaged data.

15. The method of claim 1, and further comprising:
analyzing, by a second application of the coordinator, the first data output if a trigger event occurs;
generating, by the second application, a second data output; and
incorporating, by the coordinator, the second data output in the data package;
wherein the first application is a core application and the second application is a dynamic application.

16. A system for monitoring a vehicle-borne probe, the system comprising:
a heating element associated with the probe;
a first edge device in communication with the probe and configured to:
sense data related to a characteristic of the heating element; and
perform prognostic health monitoring functions to produce a first prognostic health data output based on the sensed data related to the characteristic of the heating element;
a coordinator in communication with the first edge device and configured to receive a first data output from the first edge device and to incorporate the first data output into a data package; and
a cloud infrastructure and a ground station in communication with the coordinator via a data gateway, each being configured to analyze the data package to estimate a remaining useful life and predict a failure of the probe; and
a database in communication with the cloud infrastructure and the ground station to report the remaining useful life of the probe for vehicle maintenance personnel to monitor and consult when scheduling a timely replacement of the probe.

17. The system of claim 16, wherein the first edge device comprises:
a core application module configured to host a core application; and
a dynamic application module configured to host a dynamic application;
wherein the core application is configured to monitor and analyze sensed data and generate the first data output; and
wherein the dynamic application is configured to analyze the first data output and generate a second data output.

18. The system of claim 16 and further comprising:
a second edge device in communication with a second probe and configured to sense data related to a characteristic of a heating element of the second probe.

19. The system of claim 18, wherein the coordinator is in communication with the first edge device and the second edge device, and wherein the coordinator is configured to incorporate the first data output, the second data output, and a third data output from the second edge device into the data package.

20. The system of claim 16, wherein the vehicle is an aircraft, and wherein the probe is one of a pitot probe, a total air temperature probe, and an angle of attack probe.

* * * * *